United States Patent
Abt et al.

(10) Patent No.: US 7,712,831 B2
(45) Date of Patent: *May 11, 2010

(54) ADJUSTING SYSTEM FOR MOVING A VEHICLE SEAT IN A VEHICLE CABIN

(75) Inventors: Hans-Dieter Abt, Munich (DE); Arno Schieweck, Schwaig (DE); Wolfgang Troelenberg, Korschenbroich (DE)

(73) Assignee: Bühler Motor GmbH, Nürnberg (DE)

( * ) Notice: Subject to any disclaimer, the term of this patent is extended or adjusted under 35 U.S.C. 154(b) by 208 days.

This patent is subject to a terminal disclaimer.

(21) Appl. No.: 11/812,674

(22) Filed: Jun. 20, 2007

(65) Prior Publication Data

US 2008/0009958 A1    Jan. 10, 2008

(30) Foreign Application Priority Data

Jun. 20, 2006  (DE) .................. 10 2006 029 206
Jun. 20, 2006  (DE) .................. 10 2006 029 207

(51) Int. Cl.
| | |
|---|---|
| A47C 15/00 | (2006.01) |
| A47C 4/00 | (2006.01) |
| A47C 13/00 | (2006.01) |
| A47D 1/02 | (2006.01) |
| B60N 2/32 | (2006.01) |
| B60N 2/02 | (2006.01) |
| A61G 15/00 | (2006.01) |
| G05B 11/01 | (2006.01) |
| G05D 3/00 | (2006.01) |

(52) U.S. Cl. .................. 297/257; 297/19; 297/63; 297/68; 297/240; 297/249; 297/311; 297/354.12; 700/13; 701/49; 702/95; 702/153

(58) Field of Classification Search .......... 700/28–31, 700/11–13, 56–58, 66; 701/36, 49; 702/94, 702/150–152, 95, 153; 244/117 R, 118.5, 244/118.6, 119, 120, 122 R; 297/19, 21, 297/63–71, 232, 240, 248, 249, 301.1, 302.1, 297/311, 354.1, 354.12, 354.13, 257
See application file for complete search history.

(56) References Cited

U.S. PATENT DOCUMENTS 4,879,849 A * 11/1989 Hollingsworth et al. ........ 52/10

(Continued)

FOREIGN PATENT DOCUMENTS

DE        196 19 740 A1    12/1996

(Continued)

*Primary Examiner*—Crystal J Barnes-Bullock
(74) *Attorney, Agent, or Firm*—Jacobson Holman PLLC

(57) ABSTRACT

A vehicle seat, an adjusting system and a method for moving at least one vehicle seat arranged in a vehicle cabin, particularly an aircraft seat, comprising seat components that are coupled or guided together, such as a seat part, a backrest and a leg rest, the location and/or inclination of which can be adjusted by means of at least one or more adjusting units. The adjusting system allows a separation of the basic functions from driving devices, with an electronic device for collision-free movement and for adjusting custom-designed functions and facilitating the adaptation of the custom-designed functions. The movement sequences and movements of the respective individual seat components and the seat components in relation to one another and the movements of the components or seats within an environment or group of seats are accomplished by means of a movement model in a coordinate system.

19 Claims, 6 Drawing Sheets

U.S. PATENT DOCUMENTS

| | | | |
|---|---|---|---|
| 5,980,255 A * | 11/1999 | Mathieu et al. | 434/30 |
| 6,371,766 B1 * | 4/2002 | Doll et al. | 434/373 |
| 6,565,153 B2 * | 5/2003 | Hensel et al. | 297/285 |
| 7,073,855 B2 * | 7/2006 | Wagner et al. | 297/216.1 |
| 7,113,854 B2 * | 9/2006 | Mansell et al. | 701/36 |
| 7,194,657 B2 * | 3/2007 | Wagner | 714/14 |
| 7,427,102 B2 * | 9/2008 | Wagner et al. | 297/217.3 |
| 2004/0066067 A1 | 4/2004 | Wagner et al. | |
| 2005/0069839 A1 * | 3/2005 | Denne | 434/29 |

FOREIGN PATENT DOCUMENTS

| | | |
|---|---|---|
| DE | 103 53 020 A1 | 6/2005 |

\* cited by examiner

Fig. 1b
Fig. 1c
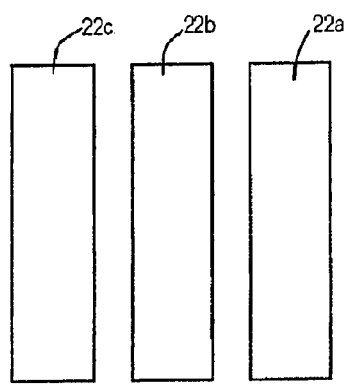
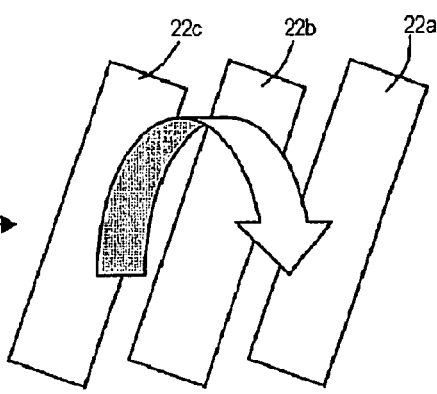
Fig. 1a
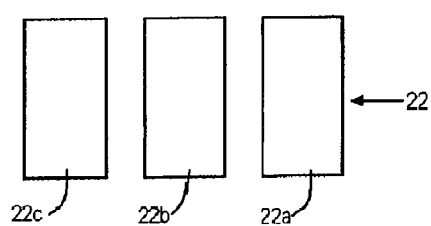
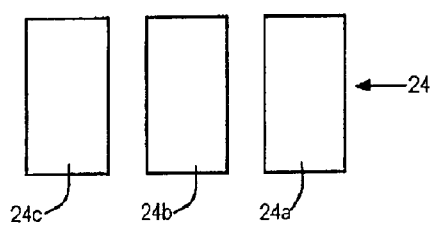

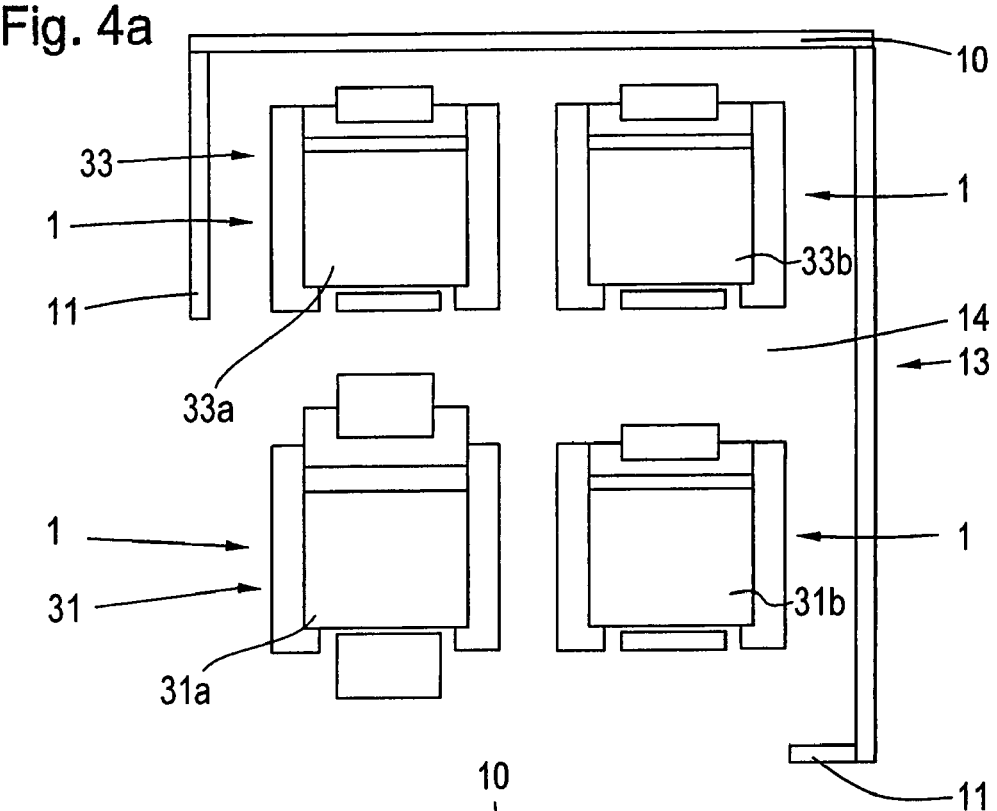
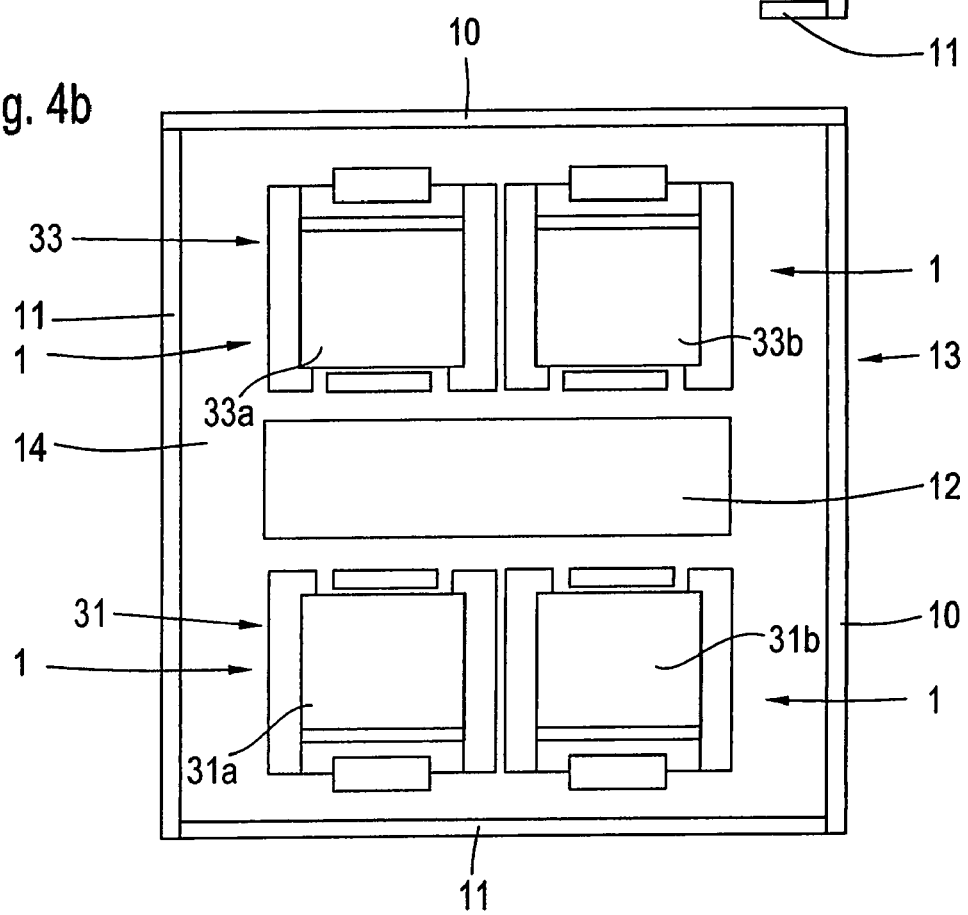

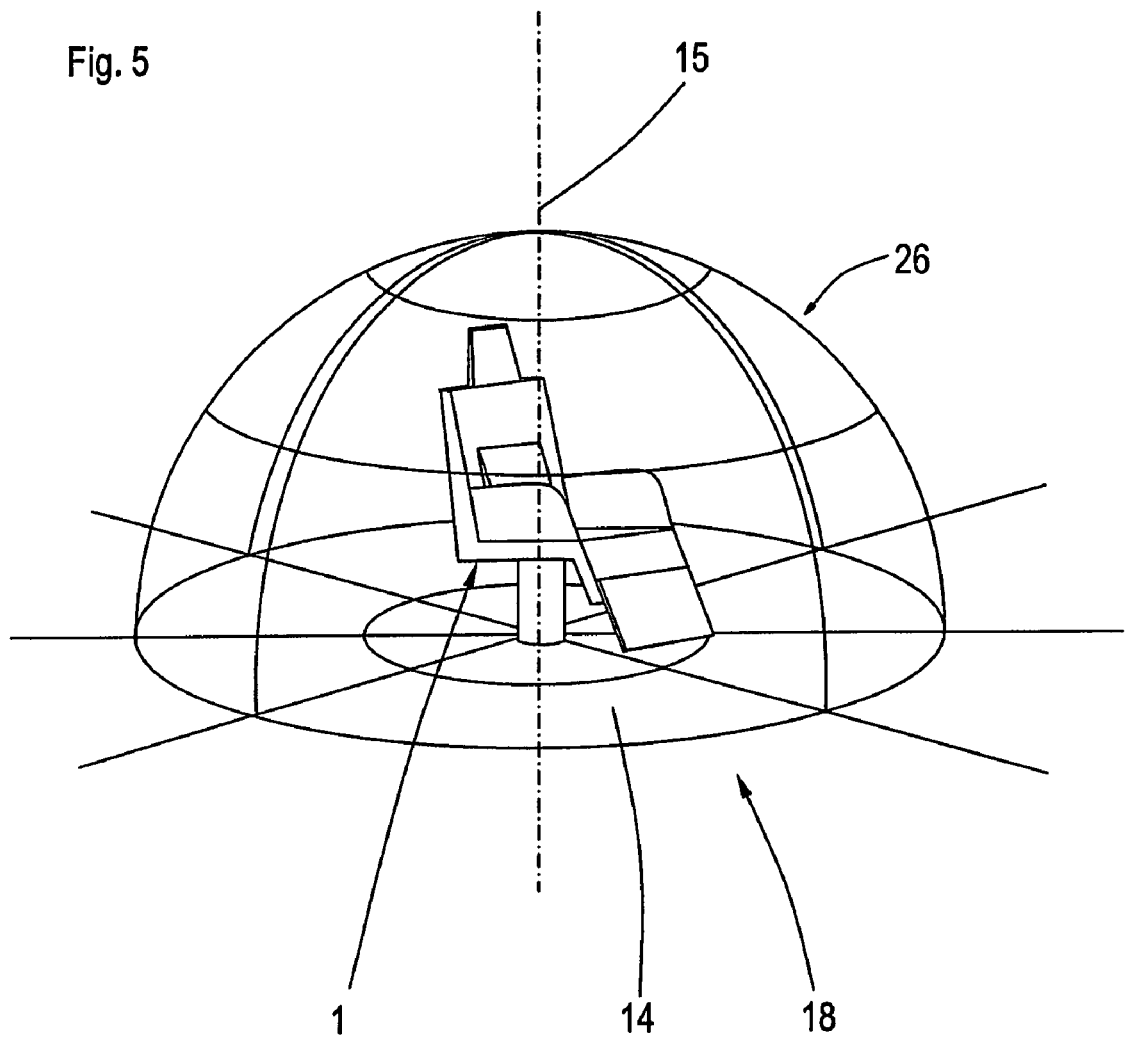

ADJUSTING SYSTEM FOR MOVING A VEHICLE SEAT IN A VEHICLE CABIN

BACKGROUND OF THE INVENTION (1) Field of the Invention

The invention relates to a vehicle seat, an adjusting system and a method for moving at least one vehicle seat arranged in a vehicle cabin, particularly an aircraft, comprising seat components that are coupled or guided together, such as a seat part, a backrest and a leg rest, the location and/or inclination of which can be adjusted by means of at least one driving device, with an electronic device for collision-free movement and for adjusting the vehicle seat in relation to a coordinate system.

(2) Description of Related Art

Today, vehicle seats, particularly aircraft seats for the business class and first class, contain a wide range of setting options. In most cases, a programmed control unit carries out the adjustment. This control unit accepts the request of the seat occupant to adjust his/her seat and carries out the corresponding adjustment of one or more seat components individually or even coherently depending on the construction and requirement of the given seat structure.

In the development phase of such a seat, a closely coordinated cooperation between the design engineer of the seat and the software developer of the control unit is necessary in order to convert the geometric data and adjustment of the respective seat components and the movement sequence of the components in relation to one another into a corresponding control program. Defining data must be determined for every seat component and for the movement of the components relative to one another. If these data are determined, they are converted into a sequence program for the control unit. This takes place by way of expressing the sequence in a currently common programming language, e.g. C, by a programmer who incorporates these sequences into the general control software. Due to this the basic functions and the movement functions are merged to form an inseparable overall software system. In most cases, only the manufacturer of the control unit can carry out modifications on the individual parts and necessitate a recompilation and validation and even a re-qualification of the overall software in an extreme case.

Since the creation of the control unit and programming are usually not among the core competencies of a seat manufacturer, the latter commissions the manufacturer of control units or a service provider to create the control unit and the software adaptation for the respective seat.

The verification of the adjustment sequence takes place at the actual seat. Since the particularities to be observed, e.g., cushions and cover fabric of the seat, are not yet available in complete form in most instances at the time of the program generation and also due to the requirement of an adjustment, which is convenient for the seat occupant, it is mostly necessary to implement adaptations even before the start of the series production.

Since the seat manufacturer mostly gets a service provider or a manufacturer of a control unit to create the control unit and the software, it is particularly difficult to implement unplanned changes because the resources of the service provider are bound by other projects at the time of the change request.

One solution for this bottleneck would be for the seat manufacturer to get his own employees to perform the independent adaptation of the software. However, this solution is hardly practical since the manufacturer of the control unit would have to disclose the entire program code of the control unit—thus his intellectual property—for this purpose. Furthermore, problems related to warranty can be expected to crop up in this approach since changes made in the program code by the seat manufacturer could also influence those points that do not concern the movement control and the seat manufacturer may not be able to predict the effects of these changes.

Published U.S. Patent Application 2004/066,067 (A1) discloses a vehicle seat and a method for the electrical movement of vehicle seats without interference, in which method limit values for the movement of the individual seat components (seat part, backrest, leg rest and seat-contact surface) are created by means of a movement model based on a two-dimensional mathematical model and envelopes or straight-lined borderlines. A monitoring system controls the actuating elements in such a way that these limit values are not violated. Every actuator is equipped with corresponding path sensors and angle sensors for this purpose.

This prior art does not take into account that future seating concepts that have already been developed to some extent will clearly require more flexibility. Future first class and business class seats will require distinctly more space with the "fully reclined" comfort requirement (full flat). In order to represent this economically, it is obvious that in addition to linear movements in the ZX direction, even position changes in the y direction (adjacent seats being pulled apart) or rotary movements of the seats are necessary. Furthermore, the requirement of bringing such seats/rows of seats into conference positions (again rotary movement) is also being recognized. This is hardly possible using the methods known heretofore.

BRIEF SUMMARY OF THE INVENTION

It is therefore an object of the invention to provide a seat adjusting system, which allows a separation of the basic functions from the custom-designed functions and facilitates the adaptation of the custom-designed functions.

This object is achieved according to the invention by completely describing the movement sequences and movements of the respective individual seat components and of these seat components in relation to one another and the movements of these components or seats within an environment or group of seats by means of a movement model. This movement model enables a separation of the basic functions of the control unit, such as, e.g., the communication with a manual operating unit, the in-flight entertainment system (IFE system) and the direct activation of seat adjusting elements, from the movement control and movement coordination of the seat. The use of the movement model helps prevent the afore-mentioned disadvantages of the prior art. It is a convenient option for the developer to configure the movement model if the latter could be entered and adapted on a personal computer (PC) or a CAD station.

The control unit comprises hardware and software. It comprises basic software, which can be interpreted as an operating system and can differ according to the client application. The control unit provides the primary control functions and comprises a processing section, which comprises software and hardware. The processing section works with the respective movement model and allows the latter to be embedded flexibly into the control unit. From an economical aspect, it is particularly useful that the control unit can be constructed modularly so that it can be adapted flexibly to different configurations.

A particularly preferred improvement of the adjusting system comprises a three-dimensional movement of the seat or seats. The three-dimensional evaluation of the permissible displacement space enables an economical, space-saving arrangement of seating systems and protects against or prevents possible collisions. It is also possible to detect the cabin boundaries on the basis of the cabin reference of the coordinate system.

It is thereby provided that the three-dimensional movement model reproduces the movement of the seat components and of the seat or of groups of seats in a three-dimensional coordinate system. The use of a spherical coordinate system has proved to be particularly suitable in this connection.

It is also another object of the invention to provide a vehicle seat and a method for moving at least one vehicle seat arranged in a vehicle cabin, thereby enabling an economical, space-saving arrangement and the displacement of the vehicle seats into other predetermined or individually controllable positions or arrangements while preventing any possible collisions.

This object is achieved according to the invention in that the coordinate system is a cabin-oriented three-dimensional coordinate system and that the electronic device controls the driving device in such a way that at least one seat can be moved and adjusted in a collision-free manner in three dimensions in relation to this coordinate system. The three-dimensional evaluation of the permissible displacement space enables an economical, space-saving arrangement of seating systems and protects against or prevents possible collisions. The cabin boundaries can also be detected on the basis of the cabin reference of the coordinate system. It is possible to ensure that a collision is prevented for every movement of the seat in all the spatial directions by controlling the movement of the seat and its components within a spatial boundary, which is characterized by a three-dimensional flat or curved enveloping surface.

The invention also relates to a system, which separates the description and implementation of the movements of the seat components from the basic program sequences of the control unit and allows the seat manufacturer to use easily operable auxiliary means to enter, modify, simulate, and test the geometric data and movements of the components and of the seat and to transfer them into the control unit for operation. The movement model describes the movement-characterizing properties of the components of a seat, of the entire seat, and also the properties of the seat in its environment. These properties are, for example, the location and the path, the maximum and minimum position, the adjustment speed, start and stop ramps and start and stop conditions, diverse termination conditions for the movement, and also a description of the dependencies on other objects.

BRIEF DESCRIPTION OF THE SEVERAL VIEWS OF THE DRAWINGS

The invention is better understood by reading the following Detailed Description of the Invention with reference to the accompanying drawing figures, in which like reference numerals refer to like elements throughout, and in which:

FIG. 1a shows two rows of seats in an upright position,

FIG. 1b shows a row of seats in a fully reclined position,

FIG. 1c shows a row of seats in a rotated position,

FIG. 4a shows a group of seats comprising two rows of seats in a cabin, FIG. 4b shows a cabin configured as a conference room, FIG. 5 shows a vehicle seat in a spherical coordinate system and FIG. 6 shows a vehicle seat with indicated limiting enveloping surfaces.

DETAILED DESCRIPTION OF THE INVENTION

Figure 2A:
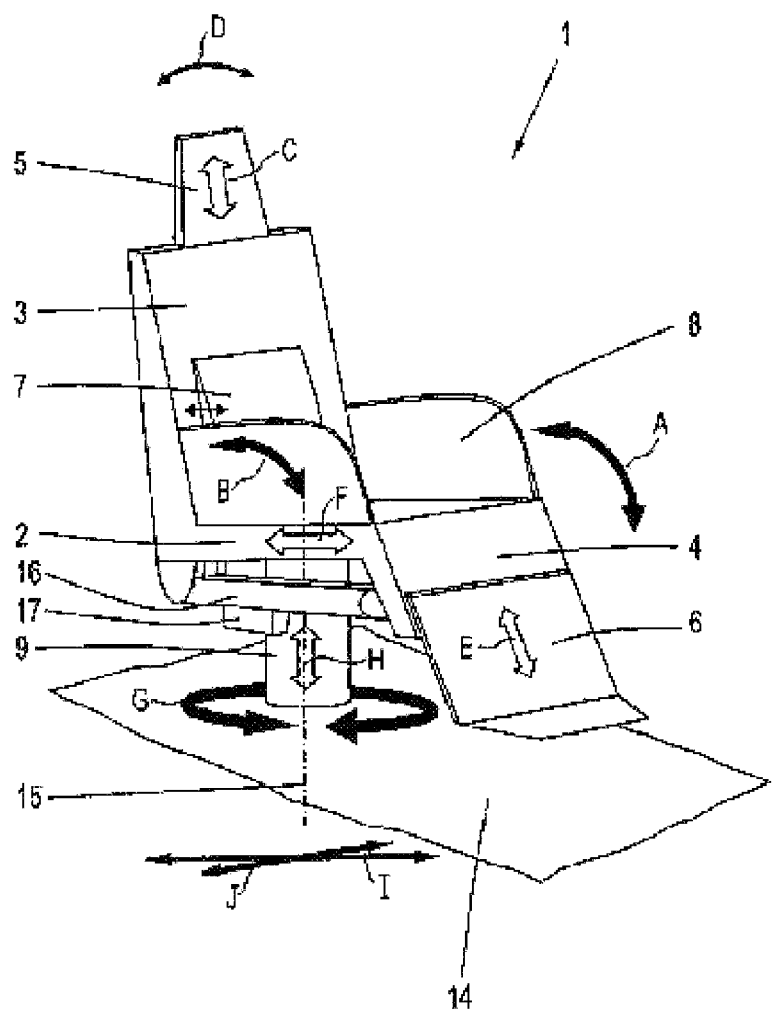
FIG. 2a is a sketch of a vehicle seat.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1a shows two rows of seats 22 and 24, each of which comprises three seats 22a-22c and 24a-24c arranged in a row next to one another. The seats are shown in the so-called TTL positions (TTL=Taxi, Take-off and Landing) in which the passengers are seated in an upright manner. FIG. 1b shows one of the rows of seats 22a-22c in the so-called full-flat position in which a leg rest is lifted and a backrest is lowered. FIG. 1c shows a row of seats 22a-22c in a rotated position. A space-saving position is assumed here since the lateral distance of the seats from one another is reduced.

FIG. 2 shows a sketch of a vehicle seat 1 comprising a seat part 2, to which a backrest 3 and a leg rest 4 are articulated such that they can be pivoted (as shown by direction arrows A and B). A headrest 5 is guided on the backrest 3 such that it 5 is adjustable in height (direction arrow C) and articulated such that its inclination can be adjusted (direction arrow D). A footrest 6 is guided on the seat part 2 such that it 6 can move longitudinally (direction arrow E). The seat part 2 can move longitudinally (direction arrow F) and is guided and supported on a seat frame 9 such that the seat part 2 can be rotated (direction arrow G) or at least pivoted. The seat frame 9 is adjustable in height (direction arrow H) and can be inclined in at least one other direction or it can be displaced linearly (back and forth (direction arrow I) or to the right and to the left (direction arrow J)). The vehicle seat 1 can rotate or at least pivot about a rotation axis 15, whereby the rotation axis 15 extends perpendicularly to a cabin floor 14. The backrest is equipped with a lumbar support 7, which can be activated electromechanically or pneumatically. If the lumbar support 7 is activated pneumatically, an air pump is disposed in the vehicle seat or in the vehicle and connected to an air cushion of the lumbar support 7. The vehicle seat 1 further comprises armrests 8, which can be driven optionally by means of an electric motor.

Figure 3A:
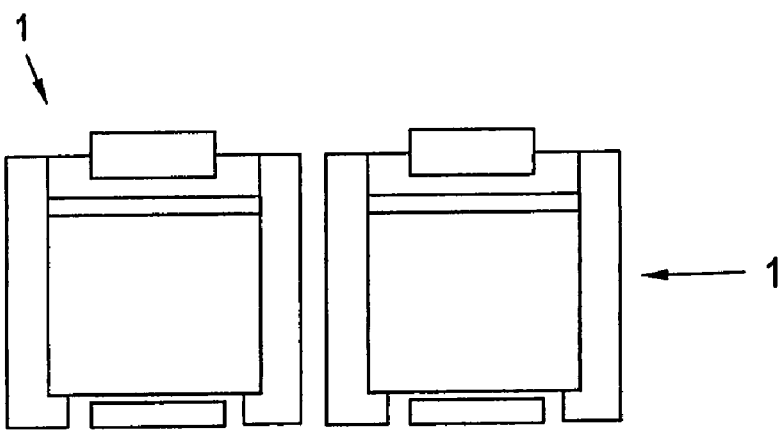
FIG. 3a shows two closely adjacent vehicle seats.
Figure 3B:
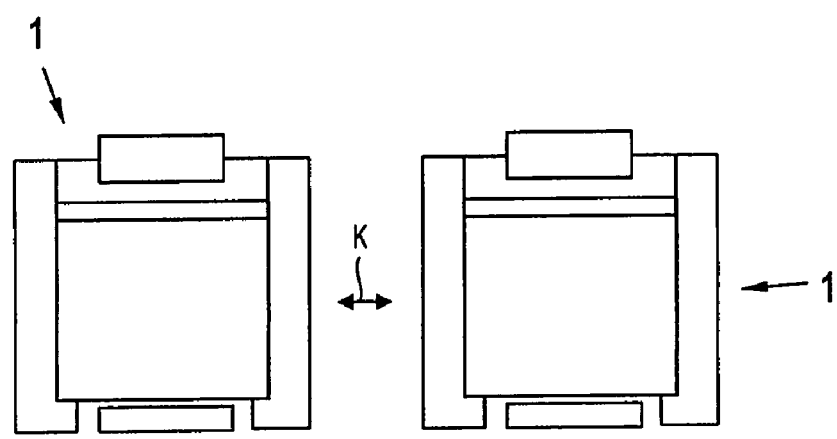
FIG. 3b shows two vehicle seats that are displaced sideways.
Figure 3C:
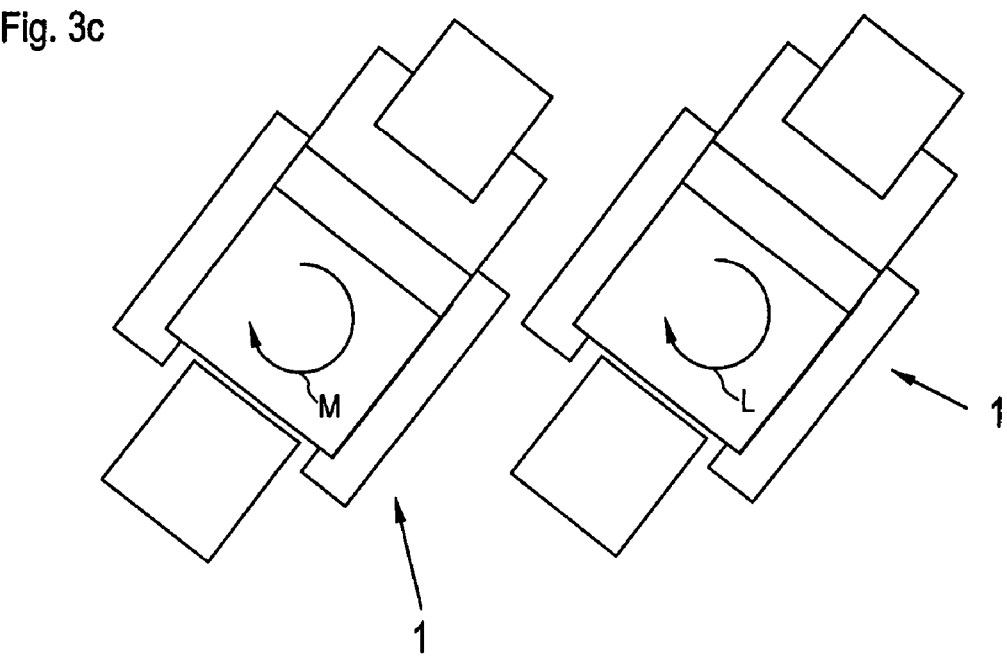
FIG. 3c shows two vehicle seats, which are co-rotated about approx. 45°.

FIG. 3a shows two closely adjacent vehicle seats 1, which are displaced sideways in FIG. 3b as shown by direction arrows K and are co-rotated about approx. 45° in FIG. 3c as shown by rotation arrows L and M. The distance of the seats from one another must be increased beforehand in order to be able to rotate them.

FIG. 4a shows a group of seats comprising two rows 31 and 33 of seats 31a, 31b and 33a, 33b, each of which comprises two vehicle seats 1, which are aligned in the same direction, inside a partially open cabin 13, which comprises fixed boundary walls 10 and flexible boundary walls 11. One seat is adjusted in a more comfortable position than the remaining ones. In order to reconfigure this seating arrangement to form a seating configuration in a conference room, two vehicle seats 1 are shown in FIG. 4b that are rotated about 180° so that the passengers can be seated facing one another. The distances of the vehicle seats 1 from one another are partly reduced and partly increased. A conference table 12 is extended between the two rows of seats and flexible boundary walls 11 were displaced in order to achieve a closed chamber.

The method for displacing the vehicle seats with the help of a three-dimensional coordinate system makes it possible to displace the vehicle seats 1 in a collision-free manner automatically or semi-automatically into another seating configuration (e.g. from FIG. 4*a* to 4*b*), taking into account both the boundaries consisting of front seat or rear seat as well as cabin boundaries.

FIG. 5 shows a vehicle seat 1, which can be rotated or pivoted about a rotation axis 15, whereby the rotation axis 15 extends perpendicularly to a cabin floor 14 and the vehicle seat 1 can be adjusted and displaced in three spatial directions in a spherical coordinate system 26.

Figure 6:
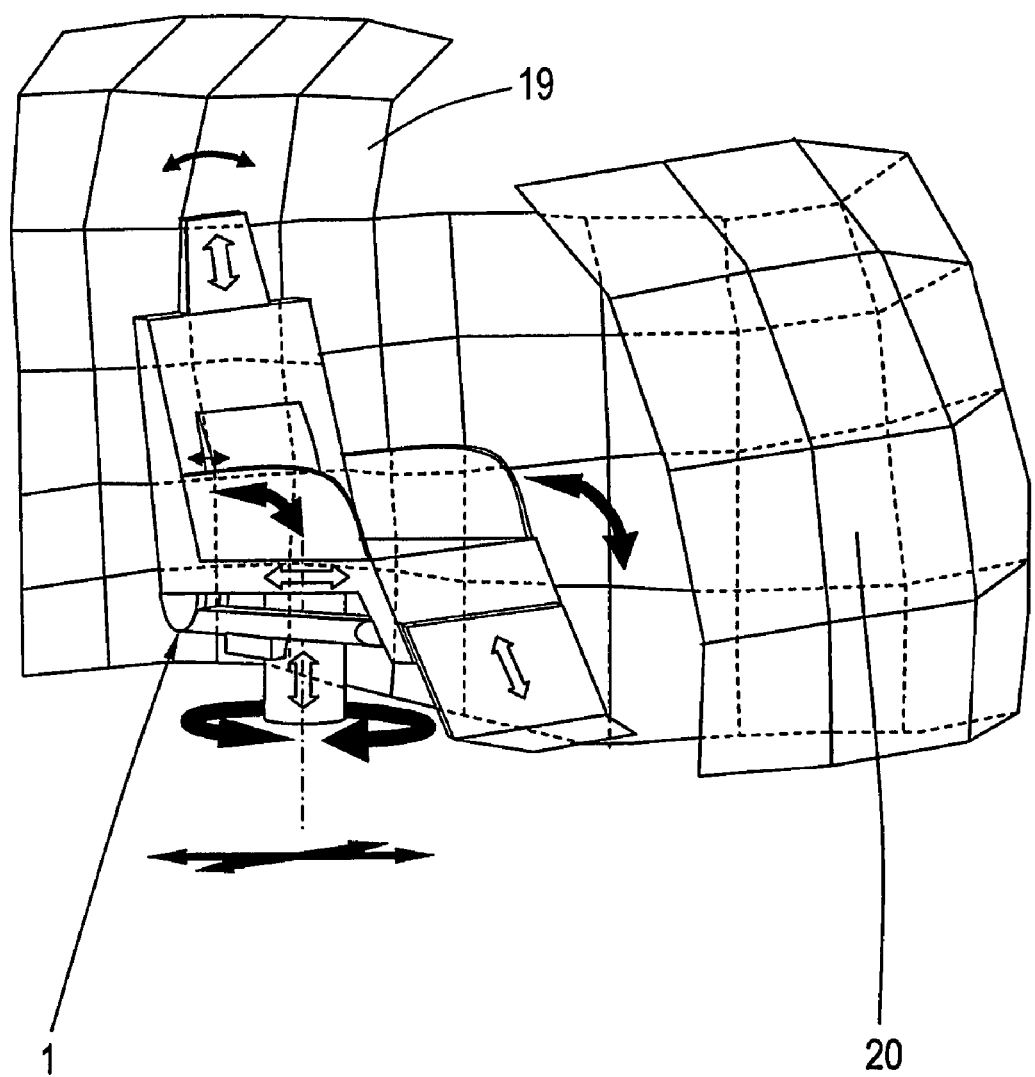

FIG. 6 shows a vehicle seat 1 with indicated limiting enveloping surfaces 20. The enveloping surfaces are included as virtual boundaries in the calculation of the maximum displacement ranges in the method according to the invention so as to be able to preclude a collision with known obstacles. Other obstacles, which do not contain any position feedback signals, must be detected by means of sensors, preferably by means of contactless sensors, e.g. ultrasound sensors.

The inventive adjusting system allows a separation of the basic functions from the custom-designed functions and facilitates the adaptation of the custom-designed functions.

This is achieved according to the invention by completely describing the movement sequences and movements of the respective individual seat components (See FIGS. 2*a* and 2*b*) and of these seat components in relation to one another and the movements of these components or seats within an environment or group of seats by means of a movement model. This movement model 41 enables a separation of the basic functions of the control unit, such as, e.g., the communication with a manual operating unit, the in-flight entertainment system (IFE system) and the direct activation of seat adjusting elements, from the movement control and movement coordination of the seat. The use of the movement model helps prevent the afore-mentioned disadvantages of the prior art. It is a convenient option for the developer to configure the movement model if the latter could be entered and adapted on a personal computer (PC) or a CAD station.

Provision is made for the limit parameters of the movement model to be generated automatically based on defined environmental descriptions. It is thus possible to implement the adaptation to geometry changes of a seat or to the association of the seats to one another more easily and to reduce the effort required to make the changes.

A particularly preferred refinement of the invention is the possibility of simulating the movement model on a PC. The invention describes a system, which separates the description and implementation of the movements of the seat components from the basic program sequences of a control unit 43 and allows the seat manufacturer to use easily operable auxiliary means to enter, modify, simulate, and test the geometric data and movements of the components and of the seat and to transfer them into the control unit for operation. It is thus possible to dispense with the high expenses of executing tests on the model or at the place of installation.

The possibility of transferring the results of a model development or of the adaptation during simulation from the PC into the control unit 43 enables the model being tested to more rapidly be placed in use. It is conceivable to create the movement model in a PC or using CAD station software or a software module, which can be loaded into a PC environment or CAD station environment (plug in).

The control unit comprises hardware and software. It comprises basic software, which can be interpreted as an operating system and can differ according to the client application. The control unit provides the primary control functions and comprises a processing section, which comprises software and hardware. The processing section works with the respective movement model and allows the latter to be embedded flexibly into the control unit. From an economical aspect, it is particularly useful that the control unit can be constructed modularly so that it can be adapted flexibly to different configurations.

The adjusting system is supposed to enable the handling of the movement model 41 of at least one seat 1. In another design form of this idea of the invention, it allows the handling of the movement model of at least one seat depending on the environmental description. The term "handling" here is meant to connote the operation of components of the seat, or of the seat in its environment. Since the environment is not fixed in most applications, but rather consists of moving elements such as neighboring seats or cabin partitions, it is important that the adjusting system also be designed for the variation of the environmental descriptions during operation.

In order to prevent collisions, it is necessary to check for any violation of limit parameters and environmental descriptions. In this connection, sensors 45 can be used which generate appropriate feedback signals whenever obstacles or predefined boundaries are approached. If these boundaries are defined boundaries, potentiometers are known to be suitable movement sensors. In the simplest case, obstacles can be detected by means of a di/dt evaluation after a contact or by means of ultrasound sensors even before a possible collision. In case of violations of limit parameters and environmental descriptions, the adjusting system is allowed to carry out definable actions. Such actions can include: stopping, moving backwards, dodging, speed adaptations or even an emission of a warning signal.

A particularly preferred improvement of the adjusting system comprises a three-dimensional movement of the seat or seats. The three-dimensional evaluation of the permissible displacement space enables an economical, space-saving arrangement of seating systems and protects against or prevents possible collisions. It is also possible to detect the cabin boundaries (See FIG. 4) on the basis of the cabin reference of the coordinate system. It is thereby provided that the three-dimensional movement model reproduces the movement of the seat components and of the seat or of groups of seats in a three-dimensional coordinate system. The use of a spherical coordinate system 26 has proved to be particularly suitable in this connection.

It is also another object of the invention to provide a vehicle seat and a method for moving at least one vehicle seat 1 arranged in a vehicle cabin 13, thereby enabling an economical, space-saving arrangement and the displacement of the vehicle seats 31, 33 into other predetermined or individually controllable positions or arrangements while preventing any possible collisions.

This object is achieved according to the invention in that the coordinate system is a cabin-oriented three-dimensional coordinate system and that the control unit 43 controls a driving device 47 in such a way that at least one seat can be moved and adjusted in a collision-free manner in three dimensions in relation to this coordinate system. The cabin boundaries can also be detected on the basis of the cabin reference of the coordinate system. It is possible to ensure that a collision is prevented for every movement of the seat in all the spatial directions by controlling the movement of the seat and its components within a spatial boundary, which is characterized by a three-dimensional flat or curved enveloping surfaces 19, 20.

It has proved to be meaningful to use a spherical coordinate system 26 for determining the position of the seat components or of the seat in relation to the cabin or in relation to other obstacles. The spherical coordinate system is particularly suitable for seats, which can be rotated or pivoted about an axis, which extends perpendicularly to the cabin floor. A rectangular coordinate system can be additionally used expediently for definite movements or movement sequences. Provision is therefore made for the use of a rectangular coordinate system in addition to the spherical coordinate system.

In order to be able to take into account even individually adjusted neighboring seats or cabin boundaries when preventing collisions, it is also possible to change the position and form of the spatial boundary—thus the enveloping surface 19,20—within which the seat can be moved freely. In order to be able to take into account environmental changes, an information exchange takes place between the seats or their control systems for adjusting the changed enveloping surface. This information exchange can take place by means of a bus system to which all the seats of a group of seats are connected. The movement of the seats is coupled automatically in order to achieve the most economical and space-saving possible arrangement of the seats.

Figure 2B:
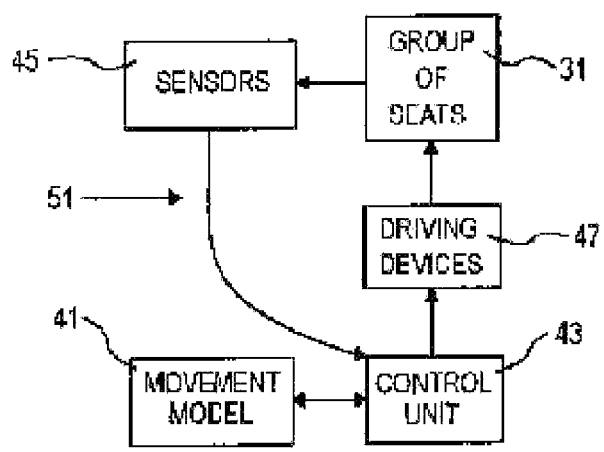
FIG. 2b is a schematic diagram of an electronic device for practicing the invention.

With reference to FIGS. 2a and 2b, the seat control system described comprises a control unit 43, actuators and suitable path sensors and angle sensors 45. As an example, rotary or linear potentiometers are suitable. Actuating or driving devices 47, which can be activated and operated electrically, provide a particularly good activating ability and high positioning accuracy.

In a particularly preferred refinement of the invention, the electronic device 51 is an adjusting system for vehicle seats or groups of vehicle seats, particularly aircraft seats, comprising one or more control units 43 and one or more adjusting units 47, wherein the movement sequences and movements of the respective individual seat components and of these seat components in relation to one another and the movements of these components or seats within an environment or a group of seats is described completely by means of a movement model 41 in a three-dimensional coordinate system. This makes it possible to separate the description and implementation of the movements of the seat components from the basic program sequences of the control unit. It is a convenient option for the developer configuring the movement model if the latter could be entered and adapted on a personal computer (PC) or CAD station.

Another solution of the object of the invention consists in a vehicle seat, which can be adjusted in relation to a coordinate system, which is a cabin-oriented three-dimensional coordinate system and the electronic device activates the driving device in such a way that at least one vehicle seat can be moved and adjusted in relation to this coordinate system in a collision-free manner in three dimensions. The three-dimensional evaluation of the permissible displacement space enables an economical, space-saving arrangement of seating systems and prevents possible collisions. It is also possible to detect the cabin boundaries on the basis of the cabin reference of the coordinate system.

It is possible to ensure that a collision is prevented for every movement of the seat in all the spatial directions by controlling the movement of the seat and its components within a spatial boundary, which is characterized by a three-dimensional flat or curved enveloping surface.

In order to be able to take into account environmental changes, an information exchange takes place between the seats or their control systems for adjusting the changed enveloping surface. This information exchange can take place by means of a bus system to which all the seats of a group of seats are connected. In the case of adjacent seats, the same controller can evaluate the sensor signals and carry out the control. In the case of the communication with the front seat or the rear seat, e.g. on-board Ethernet, CAN bus, Bluetooth or other communication protocols can be used. Other movable parts can also be expediently equipped with a communication interface in order to also be able to incorporate the data of their actual position and arrangement into the movement control.

The movement of the seats is coupled automatically in order to achieve the most economical and space-saving possible arrangement of the seats.

The invention also relates to a system, which separates the description and implementation of the movements of the seat components from the basic program sequences of the control unit and allows the seat manufacturer to use easily operable auxiliary means to enter, modify, simulate, and test the geometric data and movements of the components and of the seat and to transfer them into the control unit for operation. The movement model describes the movement-characterizing properties of the components of a seat, of the entire seat, and also the properties of the seat in its environment. These properties are, for example, the location and the path, the maximum and minimum position, the adjustment speed, start and stop ramps and start and stop conditions, diverse termination conditions for the movement, and also a description of the dependencies on other objects.

This movement model 41 enables a separation of basic control functions, such as, e.g., the communication with a manual operating unit, an in-flight entertainment system (IFE system) and the direct activation of seat adjusting elements from the movement control and movement coordination of the seat. Furthermore, it is possible to create a software tool, which runs, for example, on a PC or a CAD station and makes it possible for the seat manufacturer to describe the seat and the movement model of the respective seat. It is conceivable to be able to derive or process the design data for this purpose directly from the CAD system of the seat manufacturer.

The advantages of the afore-mentioned system and method are obvious. The control unit comprises software (operating system), which is made accountable for the respective seat application and is provided by the manufacturer of the control unit. This operating system allows the acceptance and conversion of the data and sequences of the seat adjustment from a software tool for modeling the movement sequences. Thus the manufacturer of the control unit is not required to create the actual movement software and the process of implementing and adapting the movement software becomes significantly easier for the seat manufacturer. It is now no longer necessary to consult the manufacturer of the control unit for the implementation and the adaptation of the control software, thereby resulting in considerable cost savings and time savings for the seat manufacturer, and gives him the flexibility to carry out modifications on the movement control on his own volition and on his own responsibility even shortly before the start of series production. In addition, the seat manufacturer does not have to maintain any specialized staff having programming skills in order to carry out the definition and modifications on the movement model. The design engineer or the development engineer can carry out the same using software support tools.

Likewise, the advantages for the manufacturer of the control unit are clearly visible. Firstly, it is possible to create and validate the operating system for the respective application using defined development effort. Secondly, it is not necessary to appropriate resources to cover demand peaks. Even the training for the application, maintenance and other services for the afore-described system can be completed by a third party, e.g., an engineering service provider so that the manufacturer of the control unit can maintain only the most necessary resources. This results in high operational efficiency.

Another advantage that can be mentioned is the simplified qualification. The basic system is provided with a general qualification and a certification by the manufacturer of the control unit. This certification is separate from the seat qualification, which is to be executed by the seat manufacturer with the final application, and which then only relates to the movement part and not to all the control functions and control properties. Thus the control unit and the associated engineering package can be offered virtually from stock economically and at costs that are less than those incurred heretofore for such systems. The qualification expenses of the seat manufacturer are likewise reduced drastically since those functions of the control unit that are not relevant to the movement can be omitted by the type certification (aerospace approval of the basic system, without the specific movement model for the respective application) of the control unit by the manufacturer of the control unit.

In conclusion, the above system and method ensure significant cost savings for the seat manufacturer and the manufacturer of the control unit allow the shortest possible development time and modification times for the seat manufacturer and enable a faster qualification by way of the type of certification of the system by the manufacturer of the control unit.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE NUMERALS

1 Vehicle seat
2 Seat part
3 Backrest
4 Leg rest
5 Head rest
6 Foot rest
7 Lumbar support
8 Arm rest
9 Seat frame
10 Fixed cabin boundary
11 Flexible cabin boundary
12 Table
13 Vehicle cabin
14 Cabin floor
15 Rotation axis
16 Driving device
17 Electronic device
18 Coordinate system
19 Enveloping surfaces
20 Enveloping surfaces
22 Row of seats
24 Row of seats
26 Spherical coordinate system
31 Row of seats
33 Row of seats
41 Movement model
43 Control unit
45 Sensors
47 Driving devices
51 Electronic device

The invention claimed is:

1. A system for three dimensional movement of at least one vehicle seat arranged in a cabin-oriented, three dimensional environment including an x, y, and z coordinate system with x, y, and z directions, the system comprising:
   one or more adjustable vehicle seats each being part of an arrangement of a plurality of vehicle seats within a spatial boundary, each vehicle seat including seat components that are coupled or guided together and moveable in a predetermined number of directions;
   a movement model completely describing movement sequences and movements of individual seat components and of the seat components in relation to one another, and movements of the seat components and the one or more vehicle seats within the three dimensional environment or within a group of vehicle seats;
   one or more driving devices for moving and adjusting the one or more vehicle seats in the x, y, and z directions in relation to the coordinate system in a collision-free manner relative to the remaining vehicle seats and the spatial boundary; and
   one or more control units for controlling the one or more driving devices, using the movement model.

2. The adjusting system according to claim 1, wherein parameters for the movement model are generated automatically based on defined environmental descriptions.

3. The adjusting system according to claim 2, wherein the environmental descriptions can change during operation.

4. The adjusting system according to claim 1, further comprising:
   actuators for moving the seat components;
   path sensors and angle sensors for detecting movements of the seat components; and
   means for directing the detected movements of the seat components to the one or more control units.

5. The adjusting system according to claim 1, wherein the movement model can be simulated on a rotation axis, which is perpendicular to a cabin floor.

6. The adjusting system according to claim 1, further comprising:
   limit means for providing limit parameters to the movement model; and
   environmental means for providing environmental descriptors to the movement model; and
   means for checking for a violation of the limit parameters and/or the environmental descriptions.

7. The adjusting system according to claim 6, wherein the limit parameters for the movement model are generated automatically based on the defined environmental descriptions.

8. The adjusting system according to claim 6, further comprising means for performing a check for the violation of the limit parameters and the environmental descriptions.

9. The adjusting system according to claim 8, further comprising means for executing definable actions in the case of a violation of the limit parameters and the environmental descriptions.

10. The adjusting system according to claim 1, wherein each control unit comprises an operating system, which can differ depending on a user application and wherein the control unit provides primary control functions and comprises a processing section, which includes software and hardware working with the movement model to allow the movement model to be embedded flexibly into each control unit.

11. The adjusting system according to claim 1, wherein each control unit provides the primary control functions and comprises a processing section including software and hardware.

12. The adjusting system according to claim 11, wherein the processing section works with the respective movement model and allows the movement model to be embedded flexibly into the control unit.

13. The adjusting system according to claim 1, wherein the movement model comprises a three-dimensional movement.

14. The adjusting system according to claim 1, wherein an information exchange takes place between the seats or their control units for adjusting to changes in the spatial boundaries.

15. The adjusting system according to claim 1, wherein the coordinate system is a spherical coordinate system.

16. The adjusting system according to claim 1, wherein the coordinate system refers to a cabin in which at least one seat is disposed.

17. The adjusting system according to claim 1, wherein the movement of a seat and the components thereof within a spatial boundary is characterized by a spatial three-dimensional flat or curved enveloping surface.

18. The adjusting system according to claim 17, further comprising means for changing the spatial boundary during operation, wherein the change can be detected and taken into account by the adjusting system.

19. The adjusting system according to claim 18, further comprising:

actuators for moving the seat components and path sensors and angle sensors for detecting movements of the seat components, the actuators, the path sensors, and the angle sensors together with the one or more control units defining control systems; and means for accomplishing an information exchange between the seats or their control systems for adjusting the changed spatial boundaries.

* * * * *